May 19, 1964 R. E. LE CRONIER ET AL 3,134,055
VOLTAGE LEVEL DETECTOR CIRCUITS
Filed Dec. 4, 1961 2 Sheets-Sheet 1

INVENTORS R. E. LE CRONIER
M. I. RACKMAN
BY
S.E. Hollander
ATTORNEY

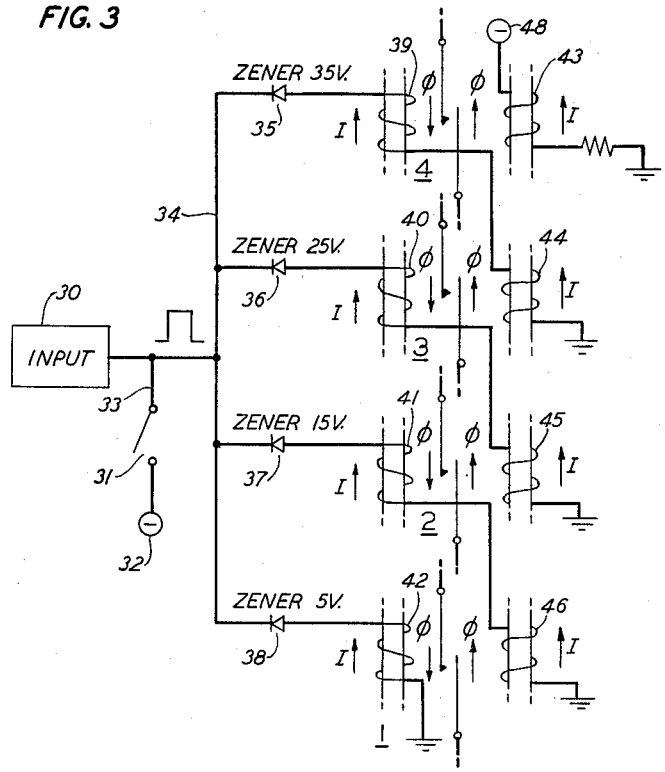
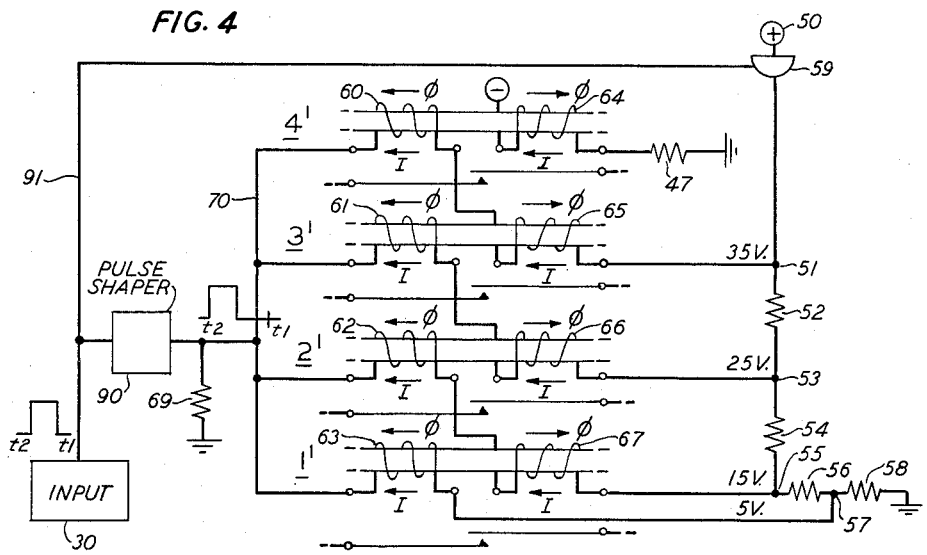

United States Patent Office 3,134,055
Patented May 19, 1964

3,134,055
VOLTAGE LEVEL DETECTOR CIRCUITS
Richard E. Le Cronier, Sea Bright, N.J., and Michael I. Rackman, Brooklyn, N.Y., assignors to Bell Telephone Laboratories, Incorporated, New York, N.Y., a corporation of New York
Filed Dec. 4, 1961, Ser. No. 156,800
12 Claims. (Cl. 317—137)

This invention relates to voltage level detectors and more particularly to voltage level detectors employing ferreed devices.

In modern technology it is often necessary to energize a particular one of a plurality of devices responsive to a respective one of a plurality of input voltages. Such a need arises, for example, in multilevel data transmission systems where the transmitted pulses may have any one of a plurality of voltage levels. The particular level must be determined by the receiver equipment, and often a particular relay or similar device must be energized responsive thereto.

The pulses are often of microsecond duration, and the circuits operated therefrom must be compatible with these short duration inputs. Relays require operating times in the order of milliseconds and consequently, if they are used in a voltage level detector circuit, buffer circuits interposed between the input source and the detector stages are often required.

Another disadvantage of voltage level detectors employing relays is that often some of the relay contacts are required for governing the operation of the detector circuit itself. The particular relay or stage operated generally controls external circuits and often numerous contacts are required to perform this function. Prior circuits, however, have often necessitated the utilization of some of the relay contacts for controlling the operation of the detector circuit itself and, consequently, fewer contacts remain for incorporation in the external circuits.

Examples of this inefficient contact apportionment can be found in those types of voltage level detectors wherein the input voltage may be at any one of $n$ levels. Each level operates a respective one of $n$ relays. Biasing circuits may be easily provided for enabling the $j$th level to energize the first $j$ relays only. However, the $j$th level should only operate the $j$th relay, and consequently, at least one set of contacts on the $j$th level is often required to release the first $j-1$ relays.

The ferreed is a relatively new switching device having an operating time in the order of milliseconds, but being responsive to pulses of microsecond durations. The basic parallel and series ferreed structures themselves are disclosed in the January 1960 issue of the Bell System Technical Journal, pages 1–30. Such devices, being responsive to short duration control signals, are ideally suited for use in a voltage level detector which must respond to short duration input pulses. However, conventional ferreeds generally have only one or two sets of contacts, and thus if they are utilized in a voltage level detector it is desirable that none of these contacts need be assigned the function of releasing other ferreeds or in any other way governing the operation of the voltage level detector itself.

It is an object of this invention to provide an improved voltage level detector.

It is another object of this invention to provide a voltage level detector responsive to pulses of microsecond durations.

It is another object of this invention to provide a voltage level detector wherein contacts of the operated stage need not be utilized for releasing other stages or for controlling the operation of the voltage level detector itself in any manner whatsoever.

In the copending application Serial No. 156,799, filed December 4, 1961, of R. E. Le Cronier and E. E. Schwenzfeger, voltage level detectors utilizing ferreeds having differential excitation in combination with Zener diodes and/or PNPN diodes are disclosed. The present invention is an improved voltage level detector wherein are incorporated ferreeds having only two coils and not requiring differential excitation. In one embodiment Zener diodes are employed. In the other, these diodes are not required, and a highly advantageous circuit is achieved.

It is still another object of this invention to provide an improved voltage level detector employing ferreeds utilizing but two coils and a reduced number of circuit components.

Each ferreed is provided with two windings, each wound around one of two sections of remanent magnetic material. If both windings are pulsed in such a manner that the two fluxes set in the device aid each other, the reed switches assume a first state. On the other hand, if the two windings are pulsed in opposite directions, the reed switches assume a second state.

Briefly, in one embodiment of the invention incorporating parallel ferreed devices, one winding of each ferreed is serially connected to one winding of an adjacent stage. Initially, all windings are pulsed in such a manner that the two fluxes in each ferreed aid each other. All the reed contacts are initially open. The $j$th input level pulses one winding of the $j$th stage and both windings of the first $j-1$ stages. Both windings of each of the first $j-1$ stages are pulsed in such directions that the fluxes in both legs of each ferreed reverse. However, as the fluxes in the two legs of each ferreed still aid each other, all the reed contacts of the first $j-1$ stages remain open. Only one winding of the $j$th stage is pulsed, however, and consequently, the flux in only one leg reverses direction. Thus, only in the $j$th stage do the two fluxes oppose each other and result in the closing of the reed contacts.

In a second embodiment of the invention, series ferreeds are utilized. The operation is similar to that of the first embodiment, the necessary modifications being made to accommodate the dual nature of the series ferreed as compared with that of the parallel ferreed. In addition, electronic means are provided for resetting the circuit prior to the application of any input pulse.

It is a feature of this invention to provide a plurality of ferreeds each having at least two windings, with one winding of each ferreed being connected in series to a winding of an adjacent ferreed.

It is another feature of this invention to provide means for reversing the flux in only one portion of only one ferreed responsive to each input voltage level.

It is another feature of this invention that for any particular input voltage level the ferreed associated with that level has a flux reversal caused by current flowing in one winding of that ferreed only, thereby effecting a closure of the contacts of that ferreed, while for ferreeds associated with lower voltage levels flux reversals are caused by currents flowing in both windings, thereby reversing the state of remanence of the magnetic material of both flux paths of the lower level ferreeds without changing the state of the contacts of those lower voltage level ferreeds.

It is another feature of this invention that voltage comparison circuitry is provided for allowing currents to flow through the ferreed windings of the ferreeds associated with all voltage levels less than the voltage of the applied signal, the currents flowing in both windings of each ferreed except the one indicating the detected voltage level, in which ferreed current flows in only one winding. More specifically in different embodiments of our invention this voltage comparison circuitry may be provided by Zener diodes of graded reverse breakdown voltages or by a voltage divider chain.

It is a further feature of this invention, in one embodiment thereof, that means are provided for inhibiting current flow in both windings of all ferreeds associated with voltage levels greater than the voltage of the applied signal.

It is a further feature of the invention, in a second embodiment thereof, that means are provided for causing current flow in both windings of all ferreeds associated with voltage levels greater than the voltage of the applied signal, thereby reversing the state of remanence of the magnetic material of both flux paths of the upper level ferreeds without changing the states of the contacts of those upper voltage level ferreeds.

It is still another feature of the invention that the states of magnetization of the remanent elements of the ferreeds be reset prior to the application of each voltage signal whoe level is to be detected.

Further objects, features and advantages of the invention will become apparent upon consideration of the following description in conjunction with the drawing, wherein:

FIGS. 3 and 4 disclose two embodiments of the invention.

Figure 1A:
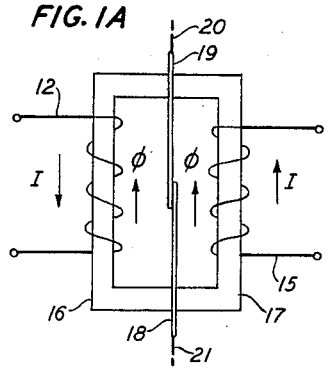
FIG. 1A shows a parallel type ferreed structure which is employed in one embodiment of the invention.

Referring to FIG. 1A, the parallel ferreed structure comprises two branches of remanent magnetic material 16 and 17. Each of these legs is connected to both soft magnetic reeds 18 and 19. In the normal position these reeds are open. When the ferreed is energized the reeds close and connect conductors 20 and 21 to one another, as shown. The soft magnetic reeds 18 and 19 are also electrical conductors so that when they close, an external circuit connected to conductors 20 and 21 is completed.

The remanent flux in each of the two legs 16 and 17 has the same magnitude. In the open position, the two fluxes aid each other. If the flux in leg 16 is in the upward direction, the flux in leg 17 is in the downward direction. Consequently, all flux is within the outer perimeter of the structure. No flux passes through the reeds 18 and 19, and they remain in their normal open position. Similarly, if the total flux in the circuit is in a counterclockwise direction, the reeds remain open.

The reeds close, however, when both fluxes are in an upward or both are in a downward direction. If the flux in leg 16 as well as the flux in leg 17 is in an upward direction, as shown, the return path for both fluxes is through the two reeds. When the flux passes through these reeds they attract each other in order to reduce the air gap between them. Thus, once both fluxes are set in the upward direction, the reeds close and remain closed. In a similar manner, if both fluxes are set in the downward direction, both reeds close.

The fluxes in the two legs are switched by current pulses applied to conductors 12 and 15. A current I is required to set the flux in each leg. If the two current pulses have the directions shown, the flux set in each of the legs is in an upward direction as shown and the reeds close. If either winding alone is thereafter pulsed in the opposite direction, the flux in the associated leg reverses direction, and consequently, the two fluxes aid each other and the reeds open.

The remanent fluxes are set by the application of microsecond pulses. Although the reeds require a time duration in the order of milliseconds to close, their closure is determined by the fluxes set by the microsecond pulses. Consequently, the ferreed can be operated by short duration input pulses and is ideally suited for use in voltage level detector.

Figure 1B:
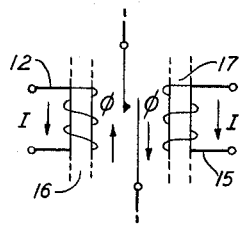
FIGS. 1B and 1C show various combinations of current and flux directions within the ferreed circuit of FIG. 1A.
Figure 1C:
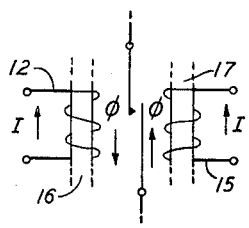

In FIGS. 1B and 1C, the arrows indicate two other combinations of the directions of the applied current pulses, and the directions of the respective fluxes set within the windings and in the legs 16 and 17. In FIG. 1B both windings have been energized by current pulses having the directions shown. Both fluxes aid each other and the ferreed shown symbolically in FIG. 1B is therefore not operated with the reeds 18 and 19 (shown in conventional "contact" form) open.

In FIG. 1C conductor 15 is energized with a current having the direction shown in FIG. 1A. The flux is consequently in an upward direction in leg 17. However, conductor 12 is energized with a current pulse having a direction opposite to that shown in FIG. 1A, and consequently the flux in leg 16 is in a downward direction. The ferreed disclosed symbolically in FIG. 1C is therefore not operated as the two fluxes aid each other. The reeds are therefore open.

Figure 2A:
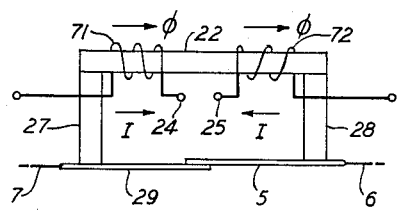
FIG. 2A shows a series type ferreed structure employed in a second embodiment of the invention.

Referring to FIG. 2A, the series ferreed structure comprises a bar 22 of remanent magnetic material, two sections 27 and 28 of soft magnetic material and two soft magnetic reeds 5 and 29. The reeds are also electrical conductors and when closed complete an electrical circuit between conductors 6 and 7.

Current applied to coil 71 sets a remanent flux in that portion of the bar 22 about which it is wound, whose direction depends upon the direction of the current in the coil. Similar remarks apply to coil 72. When the two current pulses have the directions shown, the magnetomotive forces applied to bar 22 aid each other and the total flux in bar 22 is as shown, with opposite magnetic poles being established across the reeds. A flux is set in the clockwise direction and passes through reeds 5 and 29. In this condition the reeds close. Once the remanent flux is set in bar 22 by the application of microsecond pulses, reeds 5 and 29 close, the actual closing of the reeds requiring a time duration in the order of a few milliseconds, and remain closed until current pulses are provided for releasing the contacts. Similarly, if both current pulses have directions opposite to those shown, the total flux in the device is in the counterclockwise direction and the reeds close.

If either one of the two current pulses has a direction opposite to that shown in FIG. 2A, the reeds do not close. If the current in coil 71 is from right to left, the flux set is similarly from right to left. The two fluxes thus are in opposite directions, the poles across the reeds are the same and there is accordingly no flux at the junction of the reeds to attract them together. The flux set by the current in coil 72 is from left to right in the right-hand part of bar 22. The return path for this flux is primarily through the upper portion of bar 28 and through the air. Similarly, the flux in the left part of bar 22 has a main return path through the upper part of bar 27 and the air. This condition is shown symbolically in FIG. 2B, the contacts being open.

Figure 2B:
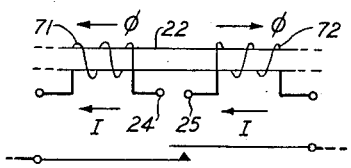
FIGS. 2B and 2C show various combinations of current and flux directions within the ferreed circuit of FIG. 2A.
Figure 2C:
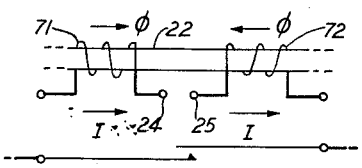

If it is the current in coil 72 which has a direction opposite to that shown in FIG. 2A, the two flux directions are as shown in FIG. 2C. Again, the fluxes oppose each other and define similar magnetic poles at the ends of the bar 22 and thus across the reeds. As a result, two separate flux paths exist, each path comprising mainly a section of bar 72, a section of one of bars 27 or 28, and an air path. As shown in FIG. 2C, the reeds are open.

The series ferreed of FIG. 2A is the dual of the parallel ferreed of FIG. 1A. In the parallel ferreed when the two fluxes aid each other no flux passes through the reeds and they remain open. In the series ferreed when the two fluxes aid each other, flux passes through the reeds and they remain closed.

The embodiment of FIG. 3 utilizes the parallel ferreed of FIG. 1A, the ferreed devices being shown symbolically as in FIGS. 1B and 1C. When the applied currents (and fluxes) have the directions shown in FIG. 1A, the reeds close. If the applied currents (and fluxes) have the directions of FIGS. 1B or 1C, the ferreeds remain unoperated.

In FIG. 3, a voltage level detector having four stages and therefore four ferreeds is shown. The input voltages are assumed to be 10, 20, 30, and 40 volts. A 10-volt input operates ferreed 1. A 20-volt input operates ferreed 2, etc. Only one ferreed is to be operated for each input pulse. The number of each ferreed stage is indicated by the underscored numerals.

One winding of each ferreed is connected to one winding of an adjacent ferreed in the manner shown. Initially, the fluxes have the directions indicated (FIG. 1C). Winding 43 of stage 4 is connected to source 48, and the flux in this winding never changes from the direction shown.

As shown, a Zener diode is connected in series with one winding of each ferreed. When a forward-bias is applied to a Zener diode, it conducts in the forward direction as do ordinary semiconductor diodes. These diodes also exhibit a high reverse impedance. However, when a reverse-bias exceeding the breakdown voltage of a Zener diode is applied, the diode breaks down and conducts in the reverse direction. The voltage maintained across the diode in the breakdown condition equals the breakdown potential. In the forward direction, the diodes offer negligible resistance.

The circuit is reset before each input pulse is applied by the input source 30. When switch 31 closes (these contacts may be closed electrically although for simplicity they are shown as being manually operated) negative source 32 is applied through conductor 33 and conductor 34 to the cathode of each of Zener diodes 35–38. The anodes of the diodes are connected through the various ferreed windings to ground. Consequently, these diodes are forward biased and currents flow from ground through each of the ferreed windings 39–42 and 44–46 to negative source 32. The flux in the ferreed windings are thus set in the directions shown (FIG. 1C). The flux in winding 43 is always in the upward direction. Consequently, each flux in every ferreed aids the other flux in the same ferreed, the total flux in each ferreed being in a counter-clockwise direction with all the reeds open.

After switch 31 is opened assume that a positive input pulse of 10-volt magnitude is applied by source 30. The reverse voltage across each of Zener diodes 35–37 does not exceed the respective breakdown potentials of these diodes, and consequently they do not conduct. Zener diode 38, however, does break down, and a 5-volt drop is maintained across this diode. The remaining five volts of the input pulse appear across winding 42 and current flows down through the coil. Consequently, the flux in leg 16 of ferreed 1 is set in the upward direction. The fluxes in ferreed 1 are therefore in the direction shown in FIG. 1A and the reeds of ferreed 1 close. It is apparent that Zener diode 38 is not required in the circuit, and it has been provided merely for the sake of uniformity.

Before the next input pulse is applied, contacts 31 are closed, and the flux in winding 42 is reset in the downward direction. The fluxes in the embodiment of FIG. 3 are thus in the directions as shown, and a new input pulse can be applied by source 30.

Assume that the next input pulse has a magnitude of 20 volts. The reverse voltage applied to Zener diodes 35 and 36 is less than their breakdown voltages, and consequently no currents flow through windings 39, 40, 44 and 45. However, the breakdown voltages of Zener diodes 37 and 38 are exceeded, and these diodes conduct in the reverse direction. Current thus flows in the downward direction in each of windings 41, 42 and 46. It is seen that the fluxes in both legs of ferreed 1 reverse directions, the total flux in this ferreed being clockwise along the outer perimeter of the structure. The flux in ferreed 1 has merely reversed its direction, that is, from a counter-clockwise direction within legs 16 and 17 (FIG. 1C) to a clockwise direction (FIG. 1B) within these same legs. The reeds of ferreed 1 still remain open.

However, only one of the two fluxes in ferreed 2 has reversed direction, namely, the flux within winding 41. The fluxes in the two legs of ferreed 2 no longer aid each other, and consequently flux passes through the two reeds 18 and 19 of ferreed 2. This is the condition shown in FIG. 1A and the reeds close.

In a similar manner, it is seen that when the 30-volt input is applied, Zener diodes 36–38 break down. Current flows through windings 40 and 45 as well as windings 41, 42 and 46. Ferreed 1 again does not operate as the flux reverses direction in both legs. Although ferreed 2 operated upon the application of the 20-volt input, it does not do so when a 30-volt input is applied. The application of this latter magnitude input causes current flow in winding 45 in the downward direction as well as in winding 41. Consequently, the fluxes in both legs of ferreed 2 reverse directions. Still, no flux passes through the soft reeds and they remain open. In ferreed 3, however, the flux has reversed direction in only one leg, that leg around which is wound winding 40. As a result, ferreed 3 operates.

Similarly, the 40-volt input causes only ferreed 4 to operate. Stages may be added indefinitely. The next stage would have its leftmost winding connected in series with winding 43 of ferreed 4. The Zener diode associated with this stage would have a breakdown potential slightly below the magnitude of the input pulse for which a ferreed 5 should operate. Similar remarks apply to all additional stages that it might be desired to add. The last stage of the extended voltage level detector would have its leftmost winding connected to the rightmost winding of the previous stage and its rightmost winding connected to source 48, as shown for winding 43 in FIG. 3, where only four stages are disclosed to operate with an input source supplying only four different magnitude pulses.

The method is conveniently summarized as follows: The $n$th input level reverses the flux direction in both legs of the first $n-1$ ferreeds. The $n$th voltage level reverses neither flux in all stages above the $n$th. Only in the $n$th stage does only one of the two fluxes reverse direction and consequently only this ferreed operates.

The embodiment of FIG. 4 is similar to that of FIG. 3. A biasing network, however, has been substituted for the plurality of Zener diodes and series ferreeds of FIG. 2A are utilized rather than their parallel counterparts. In the embodiment of FIG. 4 a source 50 is connected through normally open gate 59 to terminal 51. Through a series of resistors 52, 54, 56 and 58, terminals 51, 53, 55 and 57 are maintained at 35, 25, 15 and 5 volts, respectively, when gate 59 is operated. This gate closes when an input pulse is applied to conductor 58 connected to the control terminal of the gate. It is seen that in this scheme each series circuit of two ferreed windings terminates at a terminal having a potential equal to the breakdown voltage of the Zener diode incorporated in the same circuit in the embodiment of FIG. 3.

The purpose of incorporating the Zener diodes 35–38 in the embodiment of FIG. 3 is to prevent current flow in all of the leftmost windings above the $n$th and in all of the rightmost windings above the $(n-1)$th responsive to the application of the $n$th input level. In the embodiment of FIG. 4 these currents are not prevented from flowing. However, they are in such a direction, from right to left, as to have no effect on all stages above the $n$th responsive to the $n$th input level.

When the circuit is reset, currents flow in the directions shown. The fluxes produced in each ferreed have the directions shown in FIG. 2B and all stages are unoperated.

When the input level of 10 volts is applied, current flows from left to right in only winding 63. As terminal 55 is at 15 volts current flows from right to left in windings 67 and 62. Similarly, current flows from right to left in windings 66 and 61 and in windings 65 and 60. There is no change in flux direction, therefore, in any winding of the circuit other than winding 63. Only ferreed 1' operates as it is the only ferreed in which there is a flux change in only one winding, the total flux in the device being as that shown in FIG. 2A.

When the 20-volt input is applied, current flows from left to right in windings 63, 62 and 67, and from right to left in windings 66, 61, 65 and 60. Currents flowing from right to left in the embodiment of FIG. 4 have no effect as the magnetomotive forces produced by these currents are in directions tending to set fluxes as they already are (FIG. 2B). The fluxes in both windings 63 and 67 reverse directions, that is, the fluxes are as shown in FIG. 2C rather than FIG. 2B. The reeds of ferreed 1' remain open. Ferreed 2' is the only ferreed which operates, the fluxes in this ferreed having the directions shown in FIG. 2A. Consequently, the operation of the embodiment of FIG. 4 is similar to the operation of the embodiment of FIG. 3. The only difference is that for any particular input level those windings in FIG. 3 through which no currents flow, now have ineffectual currents flowing from right to left. As in the embodiment of FIG. 3, stages may be added indefinitely. Each new stage merely requires the addition of a resistor analogous to one of resistors 52, 54, 56 or 58.

An automatic electronic reset feature is provided in the embodiment of FIG. 4. Gate 59 operates only during the application of the input pulse. The input pulse is applied to the control terminal of the gate directly along conductor 91. It is applied to the voltage level detector input conductor 70 only after passing through pulse shaper 90. This pulse shaper, any one of well-known circuits, blocks the first part of the input pulse. Thus, the pulse is first applied to conductor 91, then to conductor 70 as well, and terminates on both conductors at the same time.

The pulse, when applied to conductor 91 operates gate 59 before conductor 70 is energized. This latter conductor is initially at ground potential, being connected to ground through resistor 69. As terminals 51, 53, 55 and 57 are all positive in potential, currents flow through windings 60–63 and 65–67 from right to left and reset every ferreed (FIG. 2B). The input pulse is then applied to conductor 70 and the appropriate ferreed operates. The pulse on conductor 70 then terminates at the same time that gate 59 is opened. The reeds of the operated ferreed remain closed.

The pulses on conductors 70 and 91 terminate simultaneously. Were gate 59 opened before the input pulse on conductor 70 had terminated, currents would flow from left to right as terminals 51, 53, 55 and 57 would all be at ground potential. And were gate 59 opened after the input pulse on conductor 70 had terminated, because conductor 70 would be at ground potential, the entire circuit would be reset, including the operated ferreed. By cutting off the first part of the pulse before it is applied to conductor 70, the circuit is not only reset automatically but the reset operation is further advantageous in that the operated stage remains operated indefinitely and is reset only when a new input is applied.

The pulse shaper 90 may, for example, comprise a capacitor which charges during the initial portion of the input pulse, and when charged enables a threshold gate which, in turn, permits the remainder of the pulse to pass through to conductor 70. As shown in FIG. 4, the input pulse is first applied at time $t_1$ and terminates at time $t_2$. The pulse applied to conductor 70 is first applied at some time intermediate $t_1$ and $t_2$, and it terminates, as does the input pulse, at time $t_2$. The flux in the ferreed to be operated is set in the latter part of the microsecond pulse. The reeds close approximately a millisecond thereafter.

It is thus seen that an improved voltage level detector responsive to pulses of microsecond durations and of minimum complexity is achieved. A ferreed with but two coils can be utilized as the registering device in each stage. It should be noted that the only circuit components required for each stage in addition to a ferreed is a Zener diode in the embodiment of FIG. 3 and a resistor in the embodiment of FIG. 4. A highly efficient voltage level detector of the utmost simplicity is achieved.

Although the invention has been described with a certain degree of particularity, it is to be understood that the present disclosure has been made only by way of example and that numerous changes in the combinations and arrangements of components may be resorted to without departing from the spirit and scope of the invention.

What is claimed is:

1. A voltage level detector comprising a plurality of ferreeds each having two windings, means serially connecting one winding of each of said ferreeds but one with one winding of another of said ferreeds, input voltage means coupled to the windings of said ferreeds, and means individually connected to each of said serially connected windings for controlling current flow through different groups of said serially connected windings responsive to respective input voltages.

2. A voltage level detector in accordance with claim 1 wherein said individually connected means comprise a plurality of voltage breakdown devices.

3. A voltage level detector in accordance with claim 1 wherein said individually connected means comprise a plurality of reference potential defining means.

4. A voltage level detector comprising a plurality of ferreed devices each having first and second windings, means individually connecting at least one winding of each of said devices in series with one winding of another of said devices, Zener diode means individually connected in series with each pair of serially connected windings, and input source means connected to each of said series connected windings for applying one of a plurality of input voltages, said Zener diode means having breakdown potentials of magnitudes related to the magnitudes of said input voltages.

5. A voltage level detector comprising a plurality of ferreeds each having first and second windings, means for individually connecting the first winding of each of said ferreeds but one to the second winding of another of said ferreeds, biasing means connected to each of said second windings, and input means connected to each of said first windings for applying one of a plurality of voltages to said first windings.

6. A voltage level detector comprising a plurality of devices each having first and second operational states, each of said devices having first and second input means for placing said devices in said first operational state when both of said input means are energized by opposing signals and for placing said devices in said second operational state when both of said input means are energized by aiding signals, means for connecting each of said first input means on each of said devices but one to a different one of said second input means on another of said devices, energizing means connected to each of said first input means on each of said devices, and means individually connected to each pair of connected first and second input means for controlling opposing signals to be applied to said first and second input means of only one of said devices responsive to the operation of said energizing means.

7. In combination, a plurality of energizable devices, each of said devices having first and second input means, any one of said devices being energized responsive to the application of opposite signals to said first and second input means thereof, source means connected to each of said devices, and means for energizing only one of said devices responsive to said source means, said energizing means including means individually and serially connected to pairs of said first and second input means on different ones of said devices for controlling the application of opposite signals to the first and second input means of only one of said devices.

8. A voltage level detector comprising a plurality of ferreeds each having first and second windings, a source of reference potential connected to one end of each of said first windings, means individually connecting the other end of each of said first windings but one to one end of the second winding of a different ferreed, a plurality of voltage breakdown means each having a different breakdown potential individually connected to the other ends of said second windings, and input voltage means connected to all of said voltage breakdown means.

9. A voltage level detector comprising a plurality of ferreeds each having first and second windings, a plurality of potential sources individually connected to one end of each of said first windings, input voltage pulse means, means for enabling said plurality of potential sources responsive to said input voltage pulse means, a plurality of means individually connecting the other end of each of said first windings but one to one end of the second winding of a different ferreed, and pulse shaper means connecting said input voltage pulse means to the other end of each of said second windings for inhibiting the initial portion of any pulse applied by said input voltage means.

10. An electrical circuit comprising a plurality of ferreeds each having two windings, means serially connecting one winding of each of said ferreeds but one with one winding of another of said ferreeds, input voltage means coupled to the windings of said plurality of ferreeds, and means individually connected to each of said serially connected windings for controlling a flux reversal in both or neither of said windings of all of said plurality of ferreeds except one responsive to said input voltage means.

11. An electrical circuit comprising a plurality of ferreeds arranged in an ordered array and each including a first and a second winding, means serially connecting a first winding of each ferreed but the first ferreed in said array with a second winding of a different ferreed in said array, means connecting said first winding of said first ferreed to a reference potential, and input circuit means connected to all of said first windings.

12. A voltage level detecting apparatus comprising a plurality of circuit paths each exhibiting a threshold of conduction corresponding to a discrete level of the voltage to be detected, a plurality of two-input devices each having two-state remanent members controlled by respective ones of its inputs, any said device being operative responsive to the production of opposite remanent states in its remanent members, each of said two-input devices having a first one of its inputs connected in a respective one of said threshold exhibiting circuit paths, the second input of all but one of said devices being connected in one of said threshold circuit paths with the first input of another of said devices, and means for initially rendering all said paths and said second input of said one of said devices conductive to establish a uniform remanent state in said remanent members, said uniform remanent state being opposite to that producible by the application to said paths of any said level of said voltage to be detected.

References Cited in the file of this patent
UNITED STATES PATENTS 3,005,072 Brown _____ Oct. 17, 1961
3,041,469 Ross _____ June 26, 1962